(12) United States Patent
Gambone et al.

(10) Patent No.: US 12,679,200 B2
(45) Date of Patent: Jul. 14, 2026

(54) VEHICLE GASEOUS FUEL STORAGE SYSTEM

(71) Applicant: Hyroad Networks LLC, Austin, TX (US)

(72) Inventors: Livio Gambone, Phoenix, AZ (US); Alex Grab, Phoenix, AZ (US); Paul Reidhead, Phoenix, AZ (US); Saravanabhavan Thanigainathan, Phoenix, AZ (US); Marco Barbi, Ulm (DE); Patrick Cibicki, Ulm (DE); Benjamin Geywitz, Ulm (DE); Philipp Konold, Ulm (DE); Matthias Morath, Ulm (DE); Juergen Spitzlberger, Ulm (DE); Angel Aranda Somolinos, Ulm (DE)

(73) Assignee: HYROAD NETWORKS LLC, Austin, TX (US)

( * ) Notice: Subject to any disclaimer, the term of this patent is extended or adjusted under 35 U.S.C. 154(b) by 378 days.

(21) Appl. No.: 18/347,220

(22) Filed: Jul. 5, 2023

(65) Prior Publication Data

US 2024/0025246 A1    Jan. 25, 2024

Related U.S. Application Data

(60) Provisional application No. 63/369,009, filed on Jul. 21, 2022.

(51) Int. Cl.
B60K 15/073    (2006.01)
B60K 15/03    (2006.01)
(Continued)

(52) U.S. Cl.
CPC ...... B60K 15/073 (2013.01); B60K 15/03006 (2013.01); B60K 15/07 (2013.01);
(Continued)

(58) Field of Classification Search
CPC ... B60K 15/07; B60K 15/03006; B62D 21/15
(Continued)

(56) References Cited

U.S. PATENT DOCUMENTS 10,081,243 B2 *  9/2018  Zimmerman .......... B60K 15/07
10,718,469 B2 *  7/2020  Sloan ...................... F17C 13/08
(Continued)

FOREIGN PATENT DOCUMENTS

CN        209290170        8/2019

OTHER PUBLICATIONS

ISA; International Search Report and Written Opinion dated Oct. 5, 2023 in Application No. PCT/US2023/026926.
(Continued)

*Primary Examiner* — Valentin Neacsu
*Assistant Examiner* — Hosam Shabara
(74) *Attorney, Agent, or Firm* — SNELL & WILMER L.L.P.

(57)        ABSTRACT

A pressure vessel mounting system for mounting a pressure vessel to a vehicle chassis is disclosed. The system includes a deformable bracket for dissipating force, for example force applied to an end of the pressure vessel. Via use of the pressure vessel mounting system, impact damage to pressure vessels may be reduced and/or eliminated.

20 Claims, 11 Drawing Sheets

(51) Int. Cl.

| | |
|---|---|
| *B60K 15/067* | (2006.01) |
| *B60K 15/07* | (2006.01) |
| *B62D 21/02* | (2006.01) |
| *B62D 21/15* | (2006.01) |
| *B62D 21/16* | (2006.01) |

(52) U.S. Cl.
CPC ............ *B62D 21/02* (2013.01); *B62D 21/15*
(2013.01); *B62D 21/16* (2013.01); *B60K*
*2015/0675* (2013.01)

(58) Field of Classification Search
USPC ......................................................... 280/834
See application file for complete search history.

(56) References Cited

U.S. PATENT DOCUMENTS

| | | | |
|---|---|---|---|
| 10,906,395 B2 * | 2/2021 | Gibb ......................... | F17C 1/00 |
| 11,008,041 B2 * | 5/2021 | Inoue ..................... | B62D 21/15 |
| 12,397,634 B2 * | 8/2025 | Yordanov ............ | B60K 15/063 |
| 2012/0174371 A1 * | 7/2012 | Koehnen ................ | B25B 5/147 |
| | | | 29/428 |
| 2019/0301682 A1 | 10/2019 | Sloan et al. | |
| 2021/0260994 A1 * | 8/2021 | Gambone .............. | B62D 21/02 |
| 2022/0118846 A1 | 4/2022 | Yordanov et al. | |

OTHER PUBLICATIONS

CIPO, Office Action dated May 13, 2025 in CA Application No. 3,261,385.

* cited by examiner

VEHICLE GASEOUS FUEL STORAGE SYSTEM

CROSS-REFERENCE TO RELATED APPLICATION

This application claims priority to, and the benefit of, U.S. Provisional Patent Application No. 63/369,009 filed on Jul. 21, 2022 entitled "Vehicle Gaseous Fuel Storage Mounting System." The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates generally to gaseous fuel storage vessels and, more particularly, to methods and apparatus used to mount gaseous fuel storage vessels into vehicle chassis.

BACKGROUND

A vehicle fuel tank, such as a pressurized tank for liquid or gaseous fuels, is desirably integrated into a vehicle in a manner that reduces damage and/or rupture in the event of a crash or other operating conditions. Additionally, a vehicle fuel tank is desirably space-efficient and resistant to movement, damage arising from vibration, and so forth. Carbon fiber reinforced composites offer light weight, corrosion resistance, high strength to weight ratios, and excellent tension and bending fatigue performance and are utilized in numerous structural applications. Notwithstanding excellent strength characteristics, vehicle fuel tanks comprising composite pressure vessels may be susceptible to damage and failure, for example when impacted during a vehicle crash. Accordingly, improved systems and methods for coupling pressure vessels to vehicles and/or absorbing impacts in connection with such vessels remain desirable.

SUMMARY

In an exemplary embodiment, a pressure vessel mounting system for mounting a pressure vessel to a vehicle chassis comprises a front bracket having a tank neck cavity and a front frame mounting flange, a rear bracket having a deformable tank mount, and a first outboard rail coupled to the front bracket and the rear bracket. The front bracket and the rear bracket are substantially parallel, and the first outboard rail extends between the front bracket and the rear bracket substantially perpendicular thereto.

In another exemplary embodiment, a vehicle chassis comprises a first frame rail substantially parallel to and spaced apart from a second frame rail, at least two crossmembers coupled to the first frame rail and the second frame rail, a gaseous fuel tank having a front neck, a rear neck, a front tank boss positioned concentrically within the front neck, and a rear tank boss positioned concentrically within the rear neck, and a first gaseous fuel tank mounting assembly coupled to the first frame rail. The first gaseous fuel tank mounting assembly comprises a front bracket having a tank neck cavity and a front frame mounting flange, a rear bracket having a deformable tank mount and a rear frame mounting flange, and a first outboard rail coupled to the front bracket and the rear bracket. The front frame mounting flange and the rear frame mounting flange are coupled to the first frame rail, the front tank boss is coupled to the front bracket, the rear tank boss is coupled to the deformable tank mount, the front bracket and the rear bracket are substantially parallel, and the first outboard rail defines a substantially 90 degree angle where it meets each of the front bracket and the rear bracket.

In another exemplary embodiment, a hydrogen electric vehicle comprises a first frame rail substantially parallel to and spaced apart from a second frame rail, at least two crossmembers coupled to the first frame rail and the second frame rail, a gaseous fuel tank having a front neck, a rear neck, a front tank boss positioned concentrically within the front neck, and a rear tank boss positioned concentrically within the rear neck, and a first gaseous fuel tank mounting assembly coupled to the first frame rail. The first gaseous fuel tank mounting assembly comprises a front bracket having a tank neck cavity and a front frame mounting flange, a rear bracket having a deformable tank mount and a rear frame mounting flange, and a first outboard rail coupled to the front bracket and the rear bracket. The front frame mounting flange and the rear frame mounting flange are coupled to the first frame rail, the front tank boss is coupled to the front bracket, the rear tank boss is coupled to the deformable tank mount, the front bracket and the rear bracket are substantially parallel, and the hydrogen electric vehicle is configured with a front end and a rear end defining a forward axis of motion for the hydrogen electric vehicle, and the first outboard rail is substantially parallel to the forward axis of motion.

The contents of this section are intended as a simplified introduction to the disclosure and are not intended to limit the scope of any claim. The foregoing features and elements may be combined in various combinations without exclusivity, unless expressly indicated otherwise.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
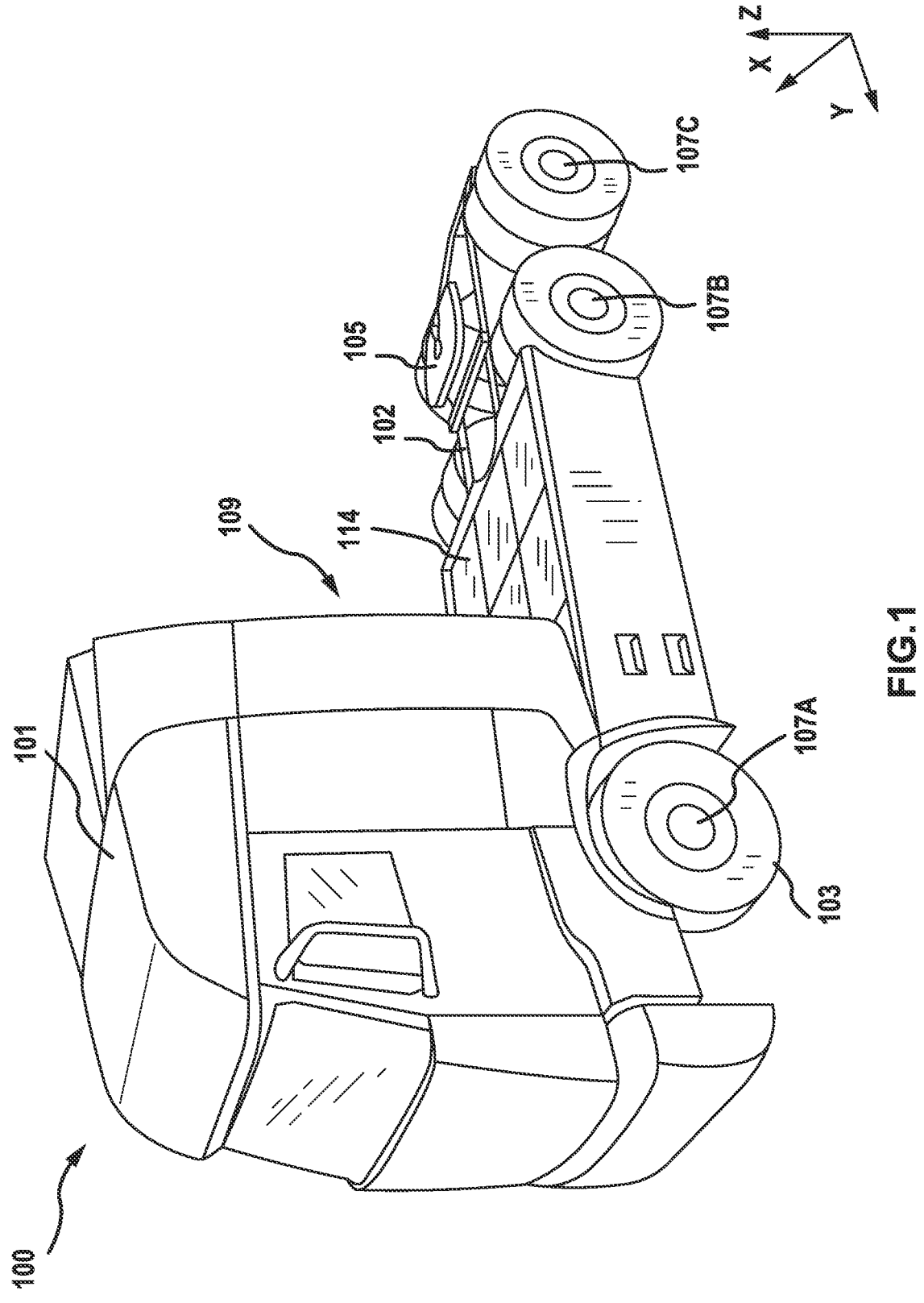
FIG. 1 illustrates a perspective view of a hydrogen electric commercial vehicle including a hydrogen tank mount assembly, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to "singular" includes plural embodiments, and any reference to "more than one" component or step may include a singular embodiment or step. Also, any reference to "attached", "fixed", "connected", or the like may include permanent, removable, temporary, partial, full or any other possible attachment option. Additionally, any reference to "without contact" (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

For the sake of brevity, conventional approaches for pressure vessel mounting, retention, protection, use, and/or the like may not be described in detail herein. Furthermore, the connecting lines shown in various figures contained herein are intended to represent exemplary functional relationships and/or physical or communicative couplings between various elements. It should be noted that many alternative or additional functional relationships or physical or communicative connections may be present in a practical system and/or related methods of use, for example an integrated fuel system associated with a fuel cell electric vehicle.

Regarding pressure vessels, Type III and IV pressure vessels are the classifications most typically used in automotive or aerospace applications. See, e.g., 49 C.F.R. § 571.304 (describing standards for fuel container integrity). Type III and IV pressure vessels may be exposed to various loads and loading scenarios depending on mounting methods. Conventional mountings of pressure vessels in the alternative fuel industry are typically accomplished by one of two methods: a strap mount or a neck mount. In a neck mount application, a first boss is typically fixed, while a second boss is allowed to slide in a neck block, allowing for expansion and contraction of the pressure vessel due to pressure and temperature changes. Regardless of the method of mounting, the integrity of the composite pressure vessel subjected to impact loads is of concern. These loads (e.g., axial, hoop, and/or radial), typically introduced in crash scenarios, may result in deformation, leakage, or rupture of the pressure vessel. Composite pressure vessels typically undergo stringent qualification testing to mitigate these failure scenarios in the form of drop and penetration testing. Despite such testing, however, composite pressure vessels may still fail occasionally in service, for example due to impact loads suffered during crash scenarios. Accordingly, via use of principles of the present disclosure as set forth in connection with various exemplary embodiments, vehicle pressure vessels may be utilized in a safer and more reliable manner.

With initial reference to FIG. 1, a vehicle 100 is illustrated, in accordance with various embodiments. In various embodiments, vehicle 100 is a hydrogen electric vehicle, and in certain embodiments, vehicle 100 is a heavy-duty hydrogen electric vehicle, such as a heavy-duty truck. Vehicle 100 may be a tractor unit which may tow a trailer unit configured to hold and transport cargo (also known as a "semi-truck"). Vehicle 100 may comprise a class 8, class 7, class 6, or any other weight classification of tractor-trailer combination. As described herein, vehicle 100 extends in a longitudinal direction along the Y-axis from a rear of vehicle 100 to a front of vehicle 100. Vehicle 100 extends in a transverse direction along the X-axis from a driver side of vehicle 100 to a passenger side of vehicle 100. Finally, vehicle 100 extends in a vertical direction along the Z-axis from a ground surface on which vehicle 100 drives to a top of vehicle 100.

Vehicle 100 comprises a cab 101 supported by a chassis 102. Cab 101 may be configured to shelter one or more vehicle operators or passengers from the external environment. In various embodiments, cab 101 comprises a door configured to allow ingress and egress into and from cab 101, one or more seats, a windshield, and numerous accessories configured to improve comfort for the operator and/or passenger(s). As illustrated in FIG. 1, vehicle 100 comprises a cab-over or cab-forward style tractor unit, but vehicle 100 is not limited in this regard and may comprise any style of tractor unit including a conventional or American cab-style tractor unit.

Chassis 102, otherwise known as the vehicle frame, is configured to couple, secure, and support various components and systems of vehicle 100 including cab 101. Chassis 102 may comprise a ladder-like structure with various mounting points for the suspension, powertrain, hydrogen storage system, and other systems of vehicle 100. As will be discussed in detail below, chassis 102 supports and is coupled to one or more hydrogen tank mount assemblies which may be configured to support and retain one or more hydrogen fuel storage tanks to provide electrical energy to propel vehicle 100 and operate systems thereof, for example, via one or more fuel cell stacks.

Vehicle 100 further comprises wheels 103 comprising one or more tires coupled to one or more axles 107 and configured to roll along a driving surface. In various embodiments, vehicle 100 comprises a pair of single wheels coupled to a front axle 107A and a pair of dual wheels coupled to two rear axles (first rear axle 107B and second rear axle 107C). One or more of the axles may be driven. For example, in various embodiments, vehicle 100 may comprise a 6×2 configuration with a single driven axle; however, vehicle 100 is not limited in this regard and may comprise a 4×2, 6×4, 6×6, or other suitable configuration. A trailer unit (not shown) may be coupled to electric vehicle 100, for example via a fifth-wheel coupling 105.

In various embodiments, vehicle 100 comprises one or more fuel cell stacks 109. Fuel cell stack(s) 109 convert gaseous or liquid fuel (such as hydrogen) to electrical energy. In various embodiments, fuel cell stack(s) 109 convert gaseous hydrogen stored within on-board hydrogen tanks into electrical energy that is supplied to one or more of an electrochemical storage device (e.g., a battery module or pack) or one or more electric motors. One or more fuel cell stacks 109 can be positioned, for example, within an engine compartment of cab 101 (where a diesel engine would be located in a conventional diesel truck). In other embodiments, fuel cell stack(s) 109 can be positioned behind cab 101, or in any other suitable location within vehicle 100.

Vehicle 100 can further comprise one or more electric axles (e-axles). For example, one or more of front axle 107A, first rear axle 107B, and second rear axle 107C of electric vehicle 100 may comprise an e-axle which may include one or more electric motors, one or more gearboxes, and a differential configured to drive the wheels of electric vehicle 100.

Vehicle 100 may further comprise, for example, one or more high voltage battery packs 114. For example, battery pack 114 may be configured to receive electrical energy from fuel cell stack 109 and to provide electrical energy to one or more electric motors of e-axle 107B and/or 107C to drive vehicle 100. In various embodiments, direct current from battery pack(s) 114 may be converted to alternating current in one or more inverters and directed to the one or more electric motors in one or more e-axles 107B and/or 107C. However, in various embodiments, an electric motor may comprise an alternating current or direct current motor coupled to a wheel. Moreover, each e-axle may comprise a solid axle configuration or a split axle configuration.

Figure 2:
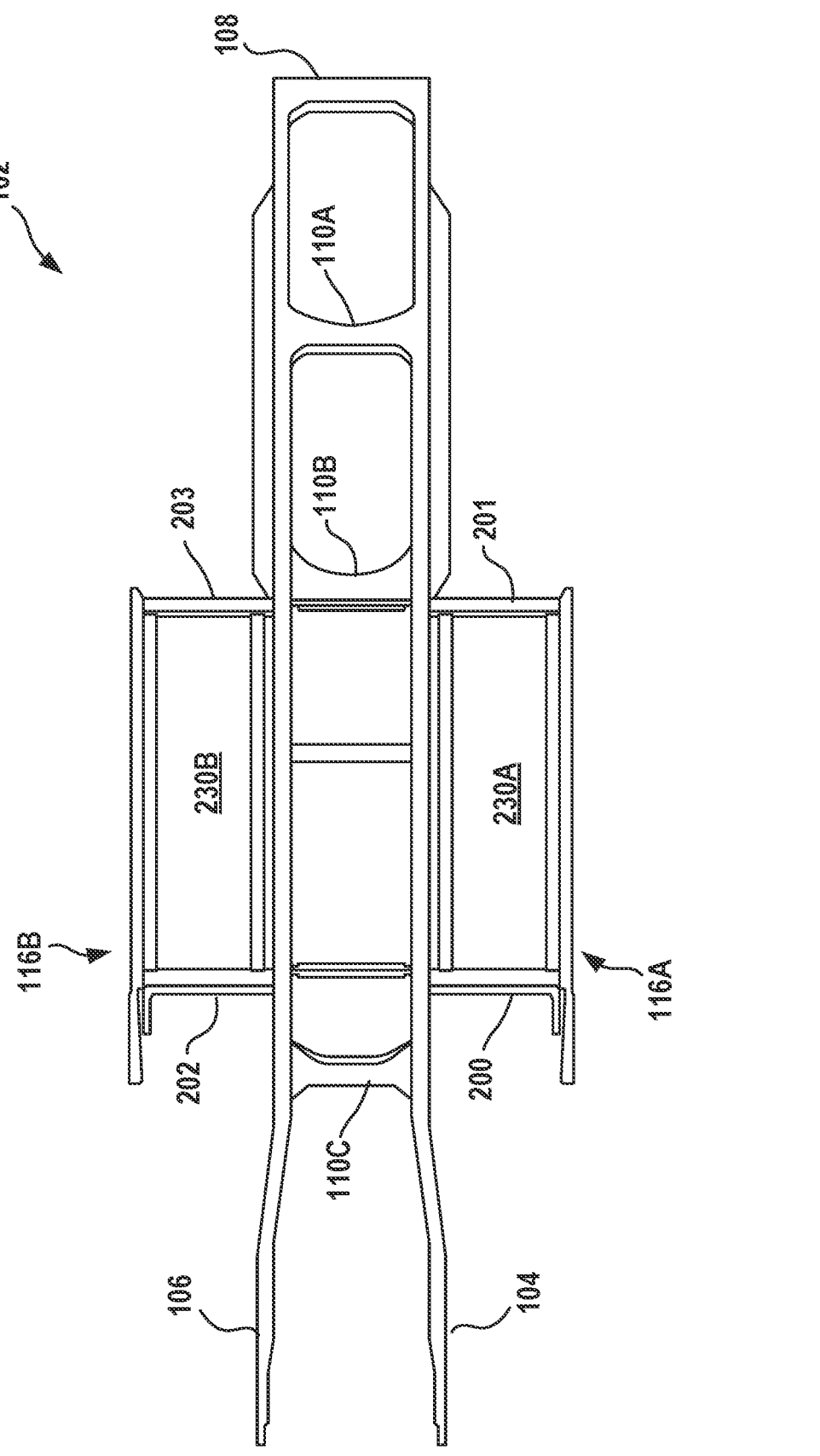
FIG. 2 illustrates a top view of a vehicle chassis including two hydrogen tank mount assemblies, in accordance with various embodiments.

With reference to FIG. 2, vehicle 100 is illustrated with various components, including cab 101, wheels 103, and fifth-wheel coupling 105 removed. Chassis 102 and components thereof may comprise any suitable high strength material capable of supporting the weight of vehicle 100 systems and components (for example, cab, suspension, hydrogen tanks, hydrogen fuel cell assemblies, and so forth) yet flexible enough to permit minor elastic deformation of chassis 102 as vehicle 100 travels and experiences stresses associated with normal operation. For example, in various embodiments, chassis 102 and components thereof may comprise a carbon steel, mild steel, cast iron, carbon fiber composite, magnesium alloy, aluminum alloy, titanium, nickel-based alloy, or any other suitable material or combinations thereof. Moreover, subcomponents of chassis 102 may be formed via any suitable fabrication technique including cutting, folding, welding, machining, punching, stamping, shearing, casting, additive manufacturing, or a combination thereof. Finally, subcomponents of chassis 102 may be coupled together utilizing any suitable technique including welding (using arc or gas welding), soldering, brazing, fastening (using rivets, screws, or nuts and bolts), press fitting, or by way of an adhesive.

Chassis 102 may comprise a "ladder frame" chassis comprising a pair of longitudinally extending side members interconnected by one or more transversely extending crossmembers. In various embodiments, chassis 102 comprises a first side member 104 and a second side member 106 opposite first side member 104. First side member 104 and second side member 106 may each comprise C-channels extending substantially parallel and extending across an entire or substantial portion (for example, about 80%) of the longitudinal length of the vehicle 100. Each side member may be mirrored about a longitudinal centerline of the vehicle 100 such that upper and lower flanges of each side member extend transversely toward the other side member in a direction away from a web of each side member. While illustrated as comprising C-channels, first side member 104 and second side member 106 are not limited in this regard and may comprise members having any suitable crosssectional geometry including hollow section, S-beams, W-beams, H-beams, I-beams, L-beams, or the like.

Chassis 102 further comprises one or more crossmembers configured to couple first side member 104 and second side member 106 substantially parallel to each other. The one or more crossmembers may be configured to resist compression and tension stresses in the transverse direction in addition to resisting torsion stresses. In various embodiments, chassis 102 may comprise an end crossmember 108 and one or more intermediate crossmembers 110. As illustrated in FIG. 2, chassis 102 comprises an end crossmember 108 and three intermediate crossmembers 110A, 110B, and 110C; however, chassis 102 is not limited in this regard and may comprise any suitable number of transversely extending crossmembers. First intermediate crossmember 110A may be spaced apart from end crossmember 108 in a direction toward a front of vehicle 100. Similarly, second intermediate crossmember 110B may be spaced apart from first intermediate crossmember 110A in a direction toward a front of vehicle 100. In various embodiments, end crossmember 108, first intermediate crossmember 110A, and second intermediate crossmember 110B are spaced equidistantly; however, these components are not limited in this regard, and may be spaced unequally. Third intermediate crossmember 110C may be spaced apart from second intermediate crossmember 110B in a direction toward a front of vehicle 100. The distance between third intermediate crossmember 110C and second intermediate crossmember 110B may be greater than the distance between second intermediate crossmember 110B and first intermediate crossmember 110A and greater than the distance between first intermediate crossmember 110A and end crossmember 108. In various embodiments, the spacing and structure of end crossmember 108 and the three intermediate crossmembers 110A-C may be configured such that chassis 102 is configured with a substantially uniform stiffness/flexibility and strength along an entire longitudinal length of chassis 102 (or along a substantial portion thereof).

End crossmember 108, first intermediate crossmember 110A, second intermediate crossmember 110B, and third intermediate crossmember 110C may each comprise C-channels comprising an upper and lower flange spaced apart by a web which together define a channel. The flanges associated with each crossmember may generally be spaced apart in a vertical direction (along the Z-axis) and extend from the web in a longitudinal direction (along the Y-axis). End crossmember 108 and third intermediate crossmember 110C may be configured such that the flanges of these crossmembers extend away from the webs of the crossmembers in a direction toward the front of vehicle 100, while first intermediate crossmember 110A and second intermediate crossmember 110B may be configured such that the flanges of these crossmembers extend away from the webs of the crossmembers in a direction toward the rear of vehicle 100. End crossmember 108 and the three intermediate crossmembers 110A-C may be coupled to first side member 104 and second side member 106 via one or more plates, fasteners, or other suitable coupling mechanism. Alternatively, the crossmembers may be formed integrally with first side member 104 and/or second side member 106.

Further, in various exemplary embodiments chassis 102 comprises a first hydrogen tank mount assembly 116A and a second hydrogen tank mount assembly 116B. First hydrogen tank mount assembly 116A can, for example, be mounted, attached, or otherwise coupled to first side member 104, and be referred to as a "driver side" tank mount assembly. Similarly, second hydrogen tank mount assembly 116B may be mounted, attached, or otherwise coupled to second side member 106, and be referred to as a "passenger side" tank mount assembly. Vehicle 100 may comprise first hydrogen tank mount assembly 116A, or second hydrogen tank mount assembly 116B, or both of first hydrogen tank mount assembly 116A and second hydrogen tank mount assembly 116B. Additionally, in some exemplary embodiments, vehicle 100 may comprise more than two hydrogen tank mount assemblies 116.

In various embodiments, first hydrogen tank mount assembly 116A may comprise a first front bracket 200 and a first rear bracket 201. Although described with reference to first hydrogen tank mount assembly 116A, second hydrogen tank assembly 116B may comprise some or all of the same components of first hydrogen tank mount assembly 116A. Further, some or all of components of first hydrogen tank mount assembly 116A may be mirrored by components of second hydrogen tank mount assembly 116B. For example, first hydrogen tank mount assembly 116A and second hydrogen tank mount assembly 116B may comprise the same components in a similar physical arrangement that is non-superimposable over the other.

First front bracket 200 and first rear bracket 201 of first hydrogen tank mount assembly 116A may support a gaseous fuel storage tank such as a hydrogen tank. Similarly, second hydrogen tank mount assembly 116B may comprise a second front bracket 202 and a second rear bracket 203. For example, a first hydrogen storage tank 230A may be positioned between, mounted to, and supported by first front bracket 200 and first rear bracket 201. Further, a second hydrogen storage tank 230B may be positioned between, mounted to, and supported by second front bracket 202 and second rear bracket 203. In various embodiments, first front bracket 200 and second front bracket 202 comprise mirrored, or non-superimposeable, configurations. Stated another way, first front bracket 200 may comprise a driver side front bracket, and second front bracket 202 may comprise a passenger side front bracket that includes the same components and structure but is a mirror image of first front bracket 200. Similar, first rear bracket 201 may comprise a mirror image of second rear bracket 203.

Figure 3:
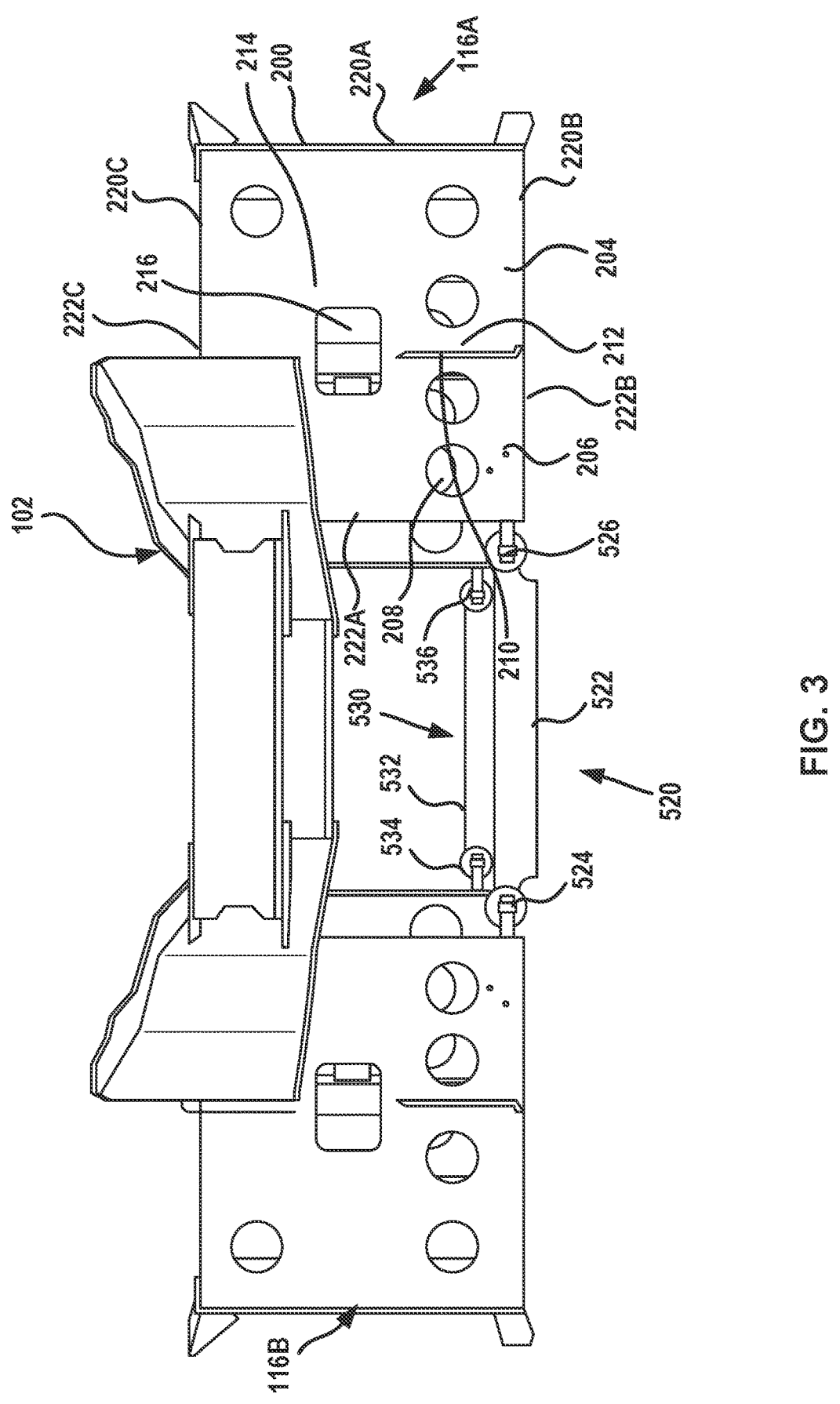
FIG. 3 illustrates a front view of a vehicle chassis including two hydrogen tank mount assemblies, in accordance with various embodiments.
Figure 4A:
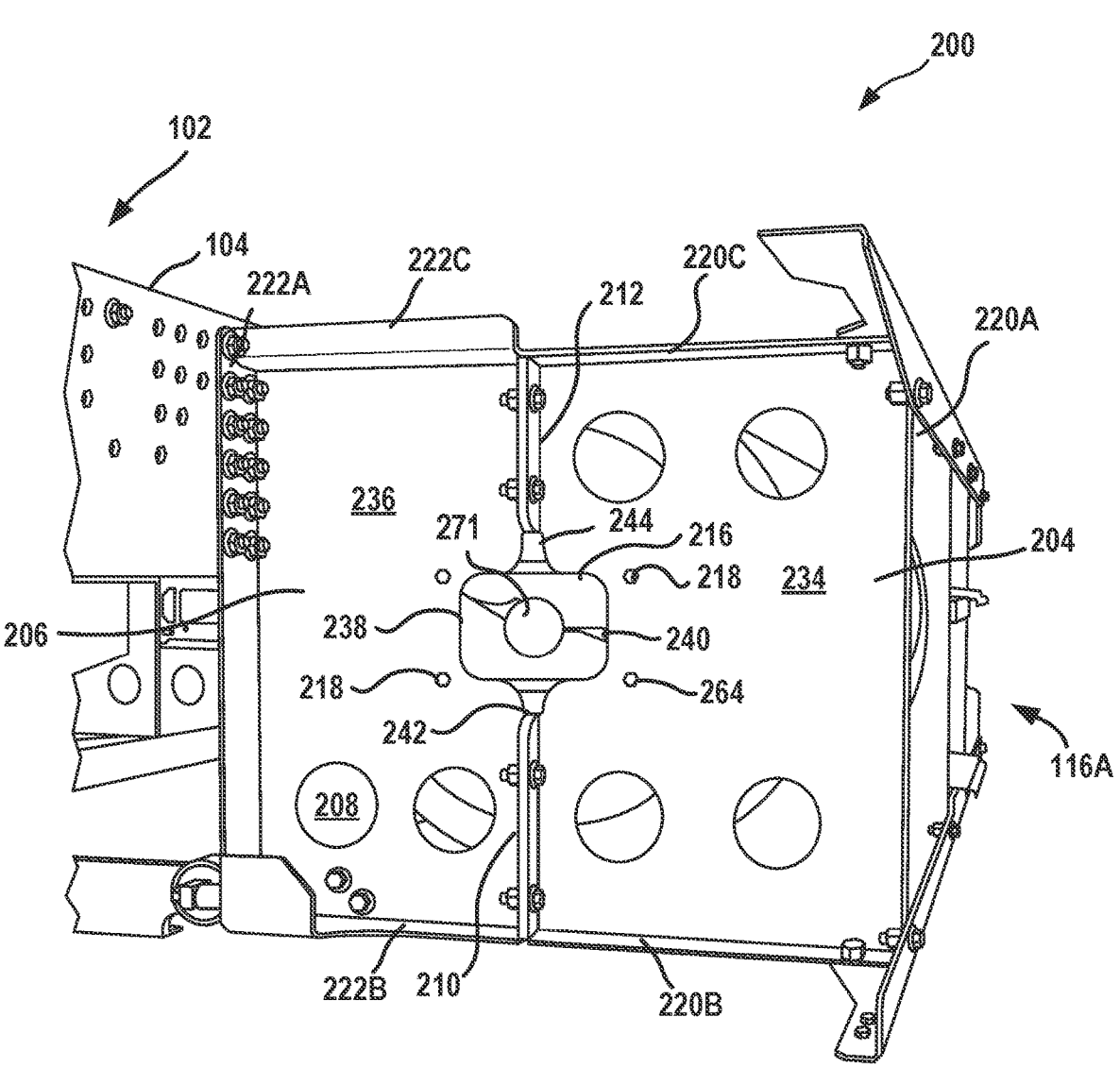
FIG. 4A illustrates a perspective view of a front bracket and hydrogen tank mount assembly, in accordance with various embodiments.
Figure 4B:
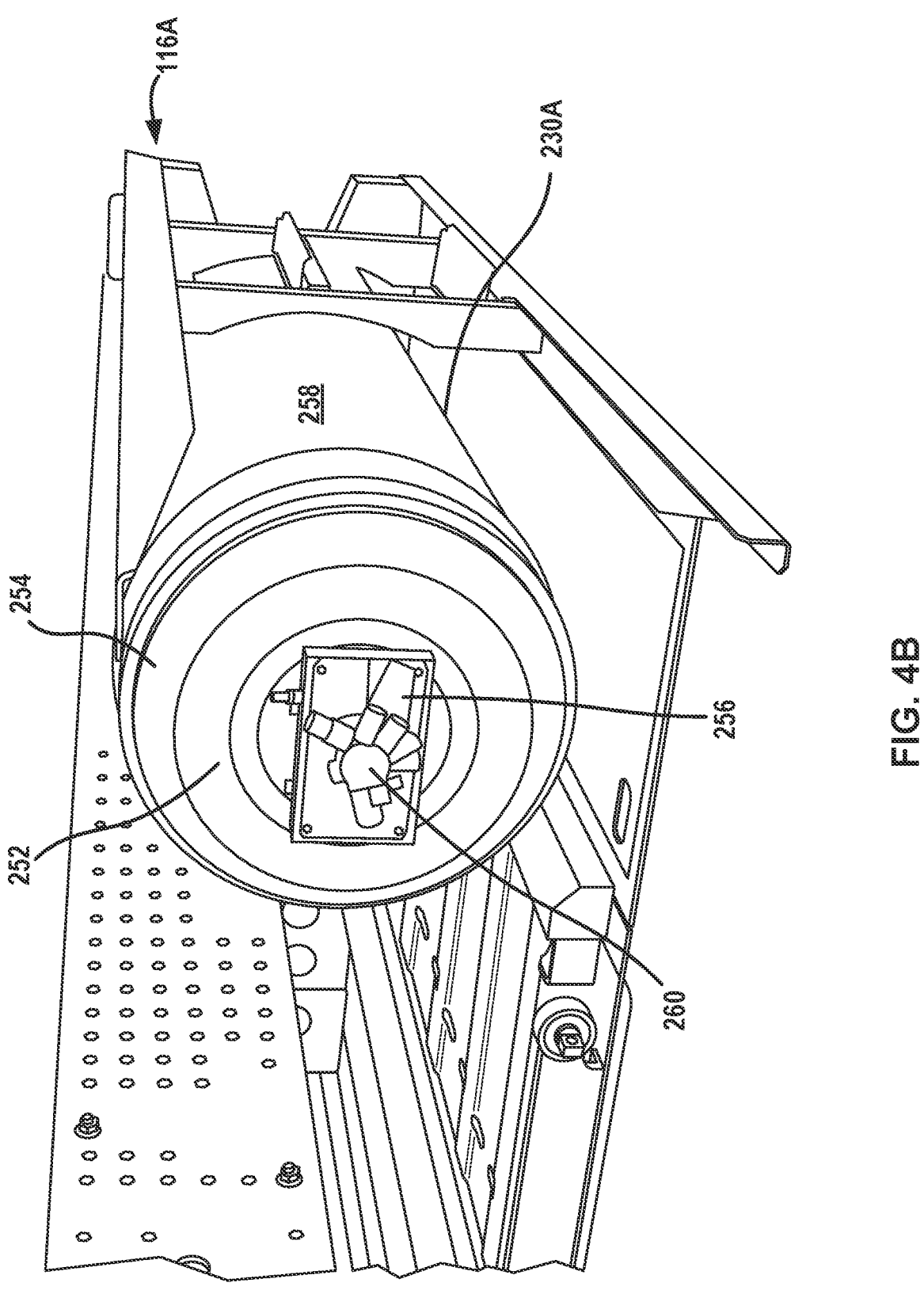
FIG. 4B illustrates another perspective view of a portion of a hydrogen storage tank and hydrogen tank mount assembly, in accordance with various embodiments.

With initial reference to FIGS. 3 and 4A-4B, in various embodiments, first front bracket 200 comprises two bracket portions joined together temporarily or permanently. In various embodiments, first front bracket 200 comprises a first front outboard bracket portion 204 and a first front inboard bracket portion 206 coupled to each other temporarily or permanently to mount and support first hydrogen storage tank 230A. For example, first front outboard bracket portion 204 and first front inboard bracket portion 206 may be coupled by fasteners, bolts, pins, or other physical means to temporarily couple the bracket portions to each other while allowing them to be disengaged and reengaged (for example, during assembly or service of vehicle 100). In various embodiments, first front outboard bracket portion 204 comprises one or more coupling flanges 210 and first front inboard bracket portion 206 comprises one or more coupling flanges 212. Coupling flanges 210 and 212 may, for example, be aligned and positioned adjacent to each other to couple and secure first front outboard bracket portion 204 and first front inboard bracket portion 206 to each other. Although described as comprising multiple bracket portions in some embodiments, first front bracket 200 may comprise a single piece bracket in other embodiments.

First front bracket 200 may comprise one or more cutouts 208. For example, one or more cutouts 208 may comprise a void formed in first front outboard bracket portion 204 and/or first front inboard bracket portion 206. Cutouts 208 may reduce the overall weight of first front bracket 200, and therefore, reduce the overall weight of chassis 102.

In various embodiments, first front outboard bracket portion 204 and/or first front inboard bracket portion 206 may comprise a generally rectangular configuration. For example, first front inboard bracket portion 206 may comprise a relatively flat, rectangular face 236. Similarly, first front outboard bracket portion 204 may comprise a generally flat, rectangular face 234. However, any suitable configuration of face 236 of first front inboard bracket portion 206 and face 234 of first front outboard bracket portion 204 are within the scope of the present disclosure.

First front inboard bracket portion 206 may comprise a notch 238. In various embodiments, notch 238 comprises a void section of face 236. For example, notch 238 may be positioned along an outer (i.e., furthest away from chassis 102) edge 242 of face 236. First front outboard bracket portion 204 may comprise a notch 240. Notch 240 may be positioned along an inner (i.e., closest to chassis 102) edge 244 of face 234. In various embodiments, notch 240 of first front outboard bracket portion 204 is complementary in position and/or configuration to notch 238 of first front inboard bracket portion 206. In various embodiments, notches 238 and 240 are positioned adjacent to one another and, when the bracket portions are coupled to each other, align and form a cavity 216. For example, cavity 216 may be oriented and positioned such that one or more components or features of a hydrogen storage tank, such as hydrogen storage tank 230A, can pass at least partially through cavity 216.

First front inboard bracket portion 206 may further comprise one or more mounting flanges configured to couple first front inboard bracket portion 206 to other components of first hydrogen tank mount assembly 116A and chassis 102. In various embodiments, first front inboard bracket portion 206 comprises mounting flanges 222A, 222B, and 222C. For example, mounting flange 222A may comprise a frame mounting flange, by which first front inboard bracket portion 206 is coupled to a frame rail of chassis 102, such as first frame rail 104. In various embodiments, mounting flange 222A of first front inboard bracket portion 206 is secured to first frame rail 104 of chassis 102 by fasteners, such as bolts, with sufficient tensile strength to secure and support first hydrogen tank mount assembly 116A to chassis 102 (e.g., grade 8 bolts). However, any suitable manner of coupling and securing mounting flange 222A to chassis 102 is within the scope of the present disclosure.

First front outboard bracket portion 204 and/or first front inboard bracket portion 206 may comprise one or more mounting holes 218 for aligning with corresponding features of first hydrogen storage tank 230A. For example, both brackets 204 and 206 can each comprise two mounting holes 218, each of which aligns with a corresponding feature of hydrogen storage tank 230A.

In various embodiments, first hydrogen storage tank 230A is positioned within first hydrogen tank mount assembly 116A. In various embodiments, first hydrogen storage tank 230A comprises a tank body 258 having a front tank shoulder 254 and front tank neck 252. A tank boss 271 may be positioned within front tank neck 252. Tank boss 271 may comprise a threaded portion concentrically positioned within front tank neck 252. A tank valve 260 may be secured to tank boss 271, for example, by threading into the threaded portion of tank boss 271. Tank valve 260 enables first hydrogen storage tank 230A to receive and dispense hydrogen gas. Further, tank valve 260 may comprise and/or be coupled to one or more pressure sensors and/or temperature sensors to monitor operating conditions within first hydrogen storage tank 230A. Moreover, tank valve 260 may further comprise a pressure release device, such as, for example, a thermally activated pressure release device.

In various embodiments, a first neck mount 256 (or a front neck mount) is mounted to tank boss 271. First neck mount 256 may comprise a sliding neck mount, such that first front tank neck 252 is slidingly secured to first hydrogen tank mount assembly 116A. First neck mount 256 can comprise one or more threaded orifices 264 configured to receive a fastener. For example, fasteners may engage threaded orifices 264 to couple first neck mount 256 to a mount or bracket of vehicle 100. Slidably mounting tank boss 271 to a mount or bracket of vehicle 100 via first neck mount 256 permits movement (for example, by expansion and contraction) of first hydrogen storage tank 230A in an axial direction with respect to an axial centerline A extending through first hydrogen storage tank 230A.

Additionally, front tank neck 252 and tank boss 271 passes through mounting cavity 216 of first front bracket 200, such that a portion of tank valve 260 is positioned within cavity 216. In various embodiments, first neck mount 256 is aligned with first front inboard bracket portion 206 and first front outboard bracket portion 204 such that mounting holes 218 are aligned with threaded orifices 264 of first neck mount 256. Fasteners may pass through mounting holes 218 to engage with threaded orifices 264 and secure first neck mount 256 to first front bracket 200.

Figure 5A:
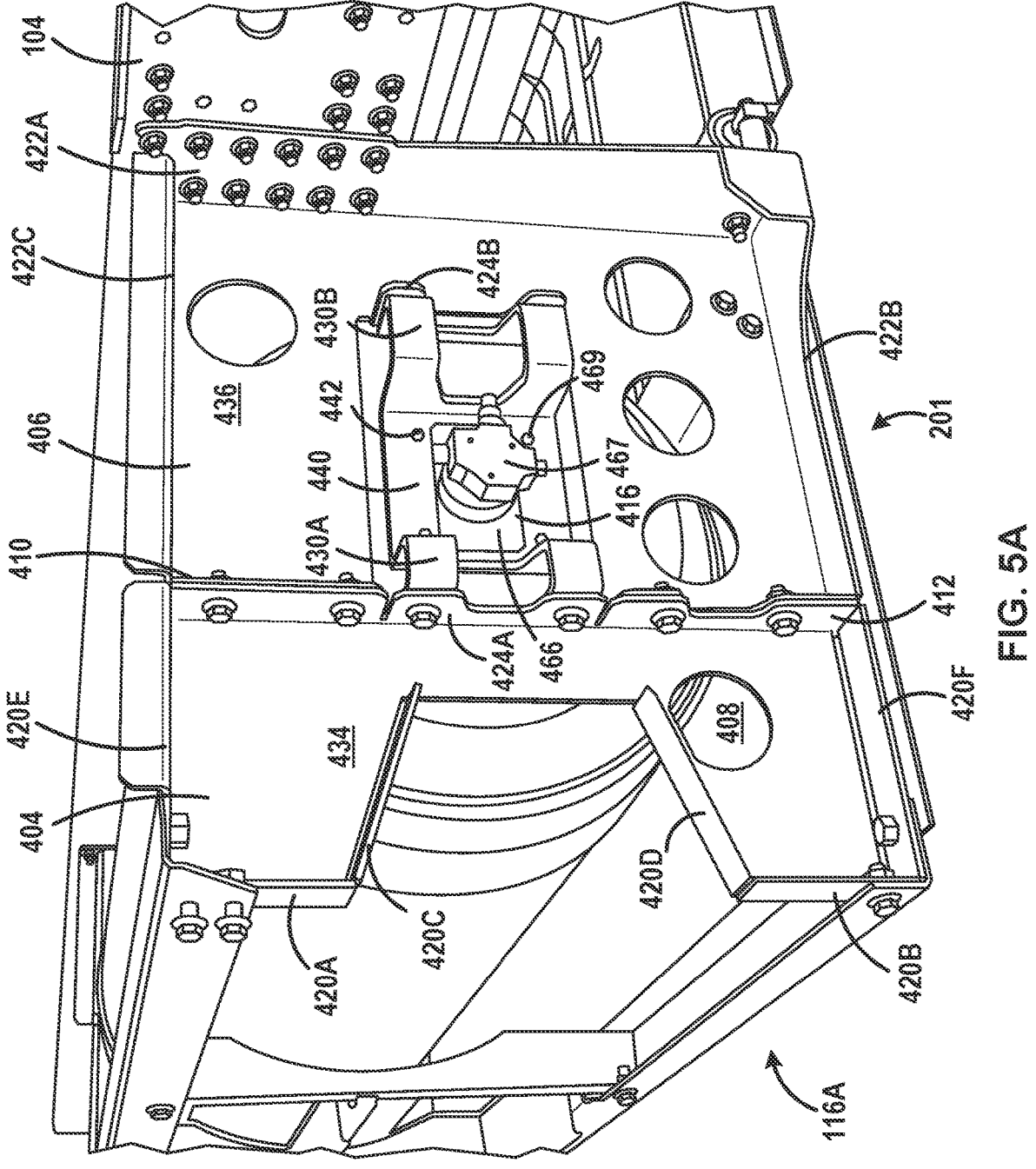
FIG. 5A illustrates a perspective view of a rear bracket and hydrogen tank mount assembly, in accordance with various embodiments.
Figure 5B:
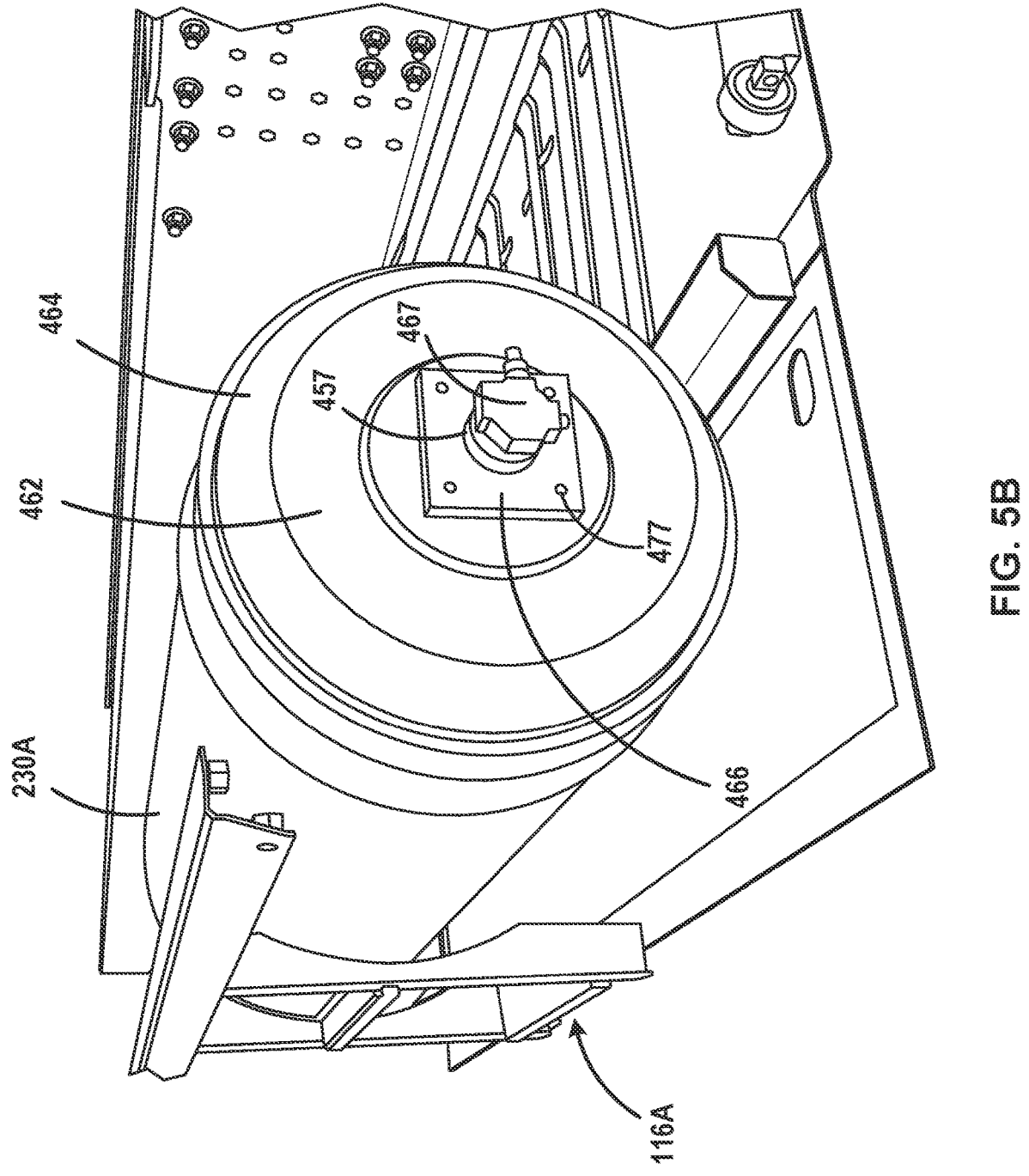
FIG. 5B illustrates another perspective view of a portion of a hydrogen storage tank and hydrogen tank mount assembly, in accordance with various embodiments.

With initial reference to FIGS. 5A and 5B, in various exemplary embodiments, first rear bracket 201 comprises a first rear outboard bracket portion 404 and a first rear inboard bracket portion 406. First rear outboard bracket portion 404 and first rear inboard bracket portion 406 may be coupled, temporarily or permanently, to mount and support first hydrogen storage tank 230A. For example, first rear outboard bracket portion 404 and first rear inboard bracket portion 406 may be coupled by fasteners, bolts, pins, or other physical means to temporarily couple the brackets to each other while allowing them to be disengaged and reengaged (for example, during assembly or service of vehicle 100). In various embodiments, first rear outboard bracket portion 404 comprises one or more coupling flanges 410, and first rear inboard bracket portion 406 comprises one or more coupling flanges 412. Coupling flanges 410 and 412 may, for example, be aligned and positioned adjacent to each other to couple and secure first rear outboard bracket portion 404 and first rear inboard bracket portion 406 to each other. Although described as comprising multiple bracket portions, first rear bracket 201 may comprise a single piece bracket.

First rear bracket 201 may comprise one or more cutouts 408. For example, one or more cutouts 408 may comprise a void formed in first rear outboard bracket portion 404 and/or first rear inboard bracket portion 406. Cutouts 408 may reduce the overall weight of first rear bracket 201, and therefore, reduce the overall weight of chassis 102.

Additionally, first rear inboard bracket portion 406 may further comprise one or more mounting flanges configured to couple first rear inboard bracket portion 406 to other components of first hydrogen tank mount assembly 116A and chassis 102. In various embodiments, first rear inboard bracket portion 406 comprises mounting flanges 422A, 422B, and 422C. For example, mounting flange 422A may comprise a frame mounting flange, by which first rear inboard bracket portion 406 is coupled to a frame rail of chassis 102, such as first frame rail 104. In various embodiments, mounting flange 422A of first rear inboard bracket portion 406 is secured to frame rail 104 of chassis 102 by fasteners, such as bolts with sufficient tensile strength to secure and support first hydrogen tank mount assembly 116A to chassis 102 (e.g., grade 8 bolts). However, any suitable manner of coupling and securing mounting flange 422A to chassis 102 is within the scope of the present disclosure.

In various embodiments, first rear inboard bracket portion 406 may comprise a generally rectangular configuration. For example, first rear inboard bracket portion 406 may comprise a relatively flat, rectangular face 436. In various embodiments, face 436 comprises a cavity 416. Cavity 416 may be configured and positioned such that one or more components of a hydrogen storage tank, such as hydrogen storage tank 230A, may pass at least partially through cavity 416.

First hydrogen storage tank 230A further comprises a rear tank shoulder 464 and rear tank neck 462 positioned on an opposite end of first hydrogen storage tank 230A of tank body 258 from front tank shoulder 254 and front tank neck 252. Similar to front tank neck 252, a tank boss 457 may be secured to rear tank neck 462. For example, tank boss 457 may comprise a threaded end positioned concentrically within rear tank neck 462. An end plug 467 may be secured to tank boss 457, allowing first hydrogen storage tank 230A to receive and dispense hydrogen gas.

In various embodiments, tank boss 457 is mounted to a second tank neck mount 466 (also referred to as a rear neck mount). Second tank neck mount 466 may comprise a fixed neck mount, such that rear tank neck 462 is fixedly secured to first hydrogen tank mount assembly 116A. Second tank neck mount 466 can comprise one or more threaded orifices 477 configured to receive a fastener. For example, fasteners may engage threaded orifices 477 to couple second tank neck mount 466 to a mount or bracket of vehicle 100. Fixedly mounting tank boss 457 to a mount or bracket of vehicle 100 via second tank neck mount 466 prevents or reduces movement of the rear end of first hydrogen storage tank 230A in an axial direction with respect to an axial centerline A extending through first hydrogen storage tank 230A.

First rear bracket 201 may further comprise a deformable tank mount 440. In various embodiments, deformable tank mount 440 can engage with, secure, and support a hydrogen storage tank (such as hydrogen storage tank 230A). Further, deformable tank mount 440 may elastically deform when force is applied to hydrogen storage tank 230A. Second tank neck mount 466 may be secured to deformable tank mount 440 of first rear bracket 201. For example, fasteners may pass through mounting holes 442 in deformable tank mount 440 to engage with threaded orifices 477 in tank boss 457, securing an end of first hydrogen storage tank 230A to first hydrogen tank mount assembly 116A.

Deformable tank mount 440 may comprise, for example, one or more outboard mounting arms 430A and one or more inboard mounting arms 430B. In various embodiments, first rear inboard bracket portion 406 comprises one or more inboard plate flanges 424B positioned and configured to engage with inboard mounting arms 430B and one or more outboard plate flanges 424A positioned and configured to engage with outboard mounting arms 430A of deformable tank mount 440.

For example, when first hydrogen tank mount assembly 116A is subjected to a force in the X direction (such as, for example, by a vehicle impacting the side of vehicle 100), components of first hydrogen tank mount assembly 116A may be displaced in the X direction towards hydrogen storage tank 230A. If sufficient force is applied to displace, bend, or otherwise move components of first hydrogen tank mount assembly 116A, these components may contact hydrogen storage tank 230A and transfer force to hydrogen storage tank 230A in the X direction. In such circumstances, in response to force in the X direction, deformable tank mount 440 may allow rear tank neck 462 and tank boss 457 to be displaced in the X direction and dissipate a portion of the force by plastic deformation. In various embodiments, outboard mounting arms 430A and inboard mounting arms 430B of deformable tank mount 440 plastically deform when subjected to a threshold level of force in the X direction, absorbing and/or dissipating force applied to hydrogen storage tank 230A in the X direction.

First rear outboard bracket portion 404 may comprise a face 434 having one or more flanges positioned along outer its edges. For example, flanges arranged around edges of face 434 may impart stiffness and strength to face 434 and/or allow face 434 to engage with other components of first rear bracket 201 and/or first hydrogen tank mount assembly 116A. In various embodiments, first rear outboard bracket portion 404 comprises flanges 420A-F. Flanges 420A and 420B can comprise complementary (e.g., similarly shaped and configured) flanges configured to couple first rear outboard bracket portion 404 to components of first hydrogen tank mount assembly 116A. Flanges 420C and 420D can comprise complementary flanges configured to provide rigidity and/or strength to face 434. Flanges 420E and 420F can comprise complementary flanges configured to couple first rear outboard bracket portion 404 to components of first hydrogen tank mount assembly 116A. Although described with specific reference to flanges 420A-F, any suitable configuration of flanges positioned along an outer edge of face 434 are within the scope of the present disclosure.

Figure 6A:
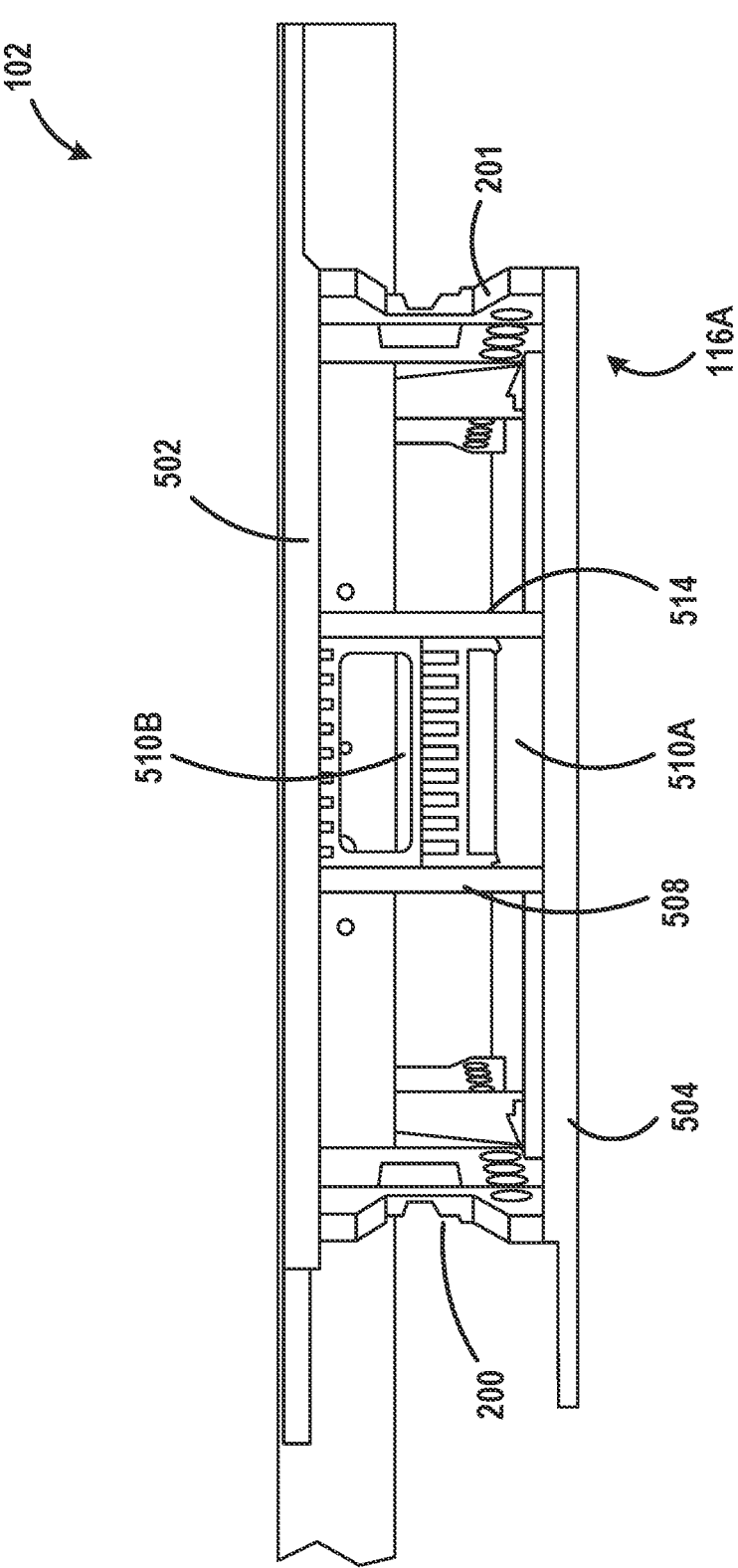
FIGS. 6A-6D illustrate various views of a vehicle chassis including two hydrogen tank mount assemblies, in accordance with various embodiments.
Figure 6B:
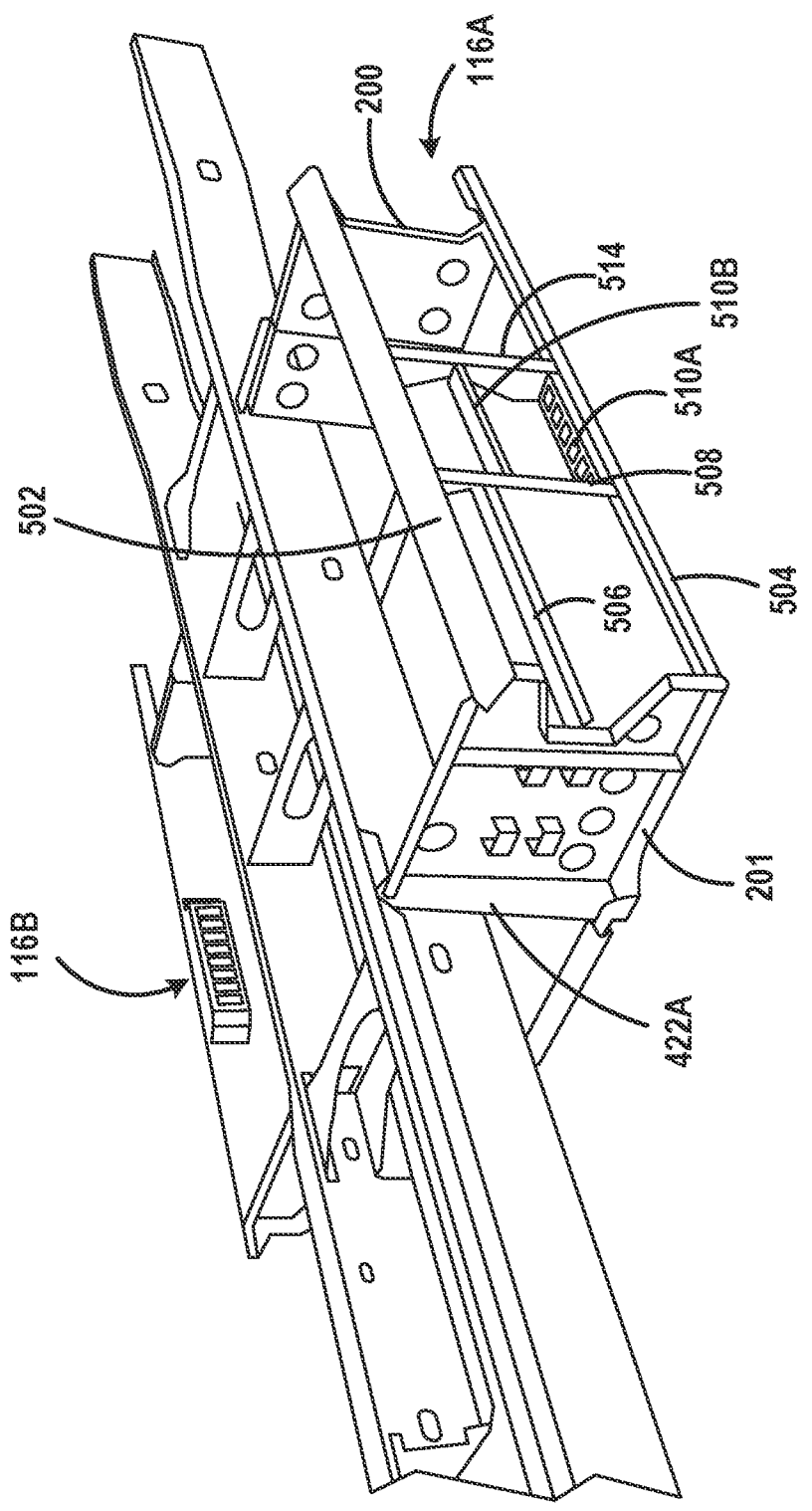
Figure 6C:
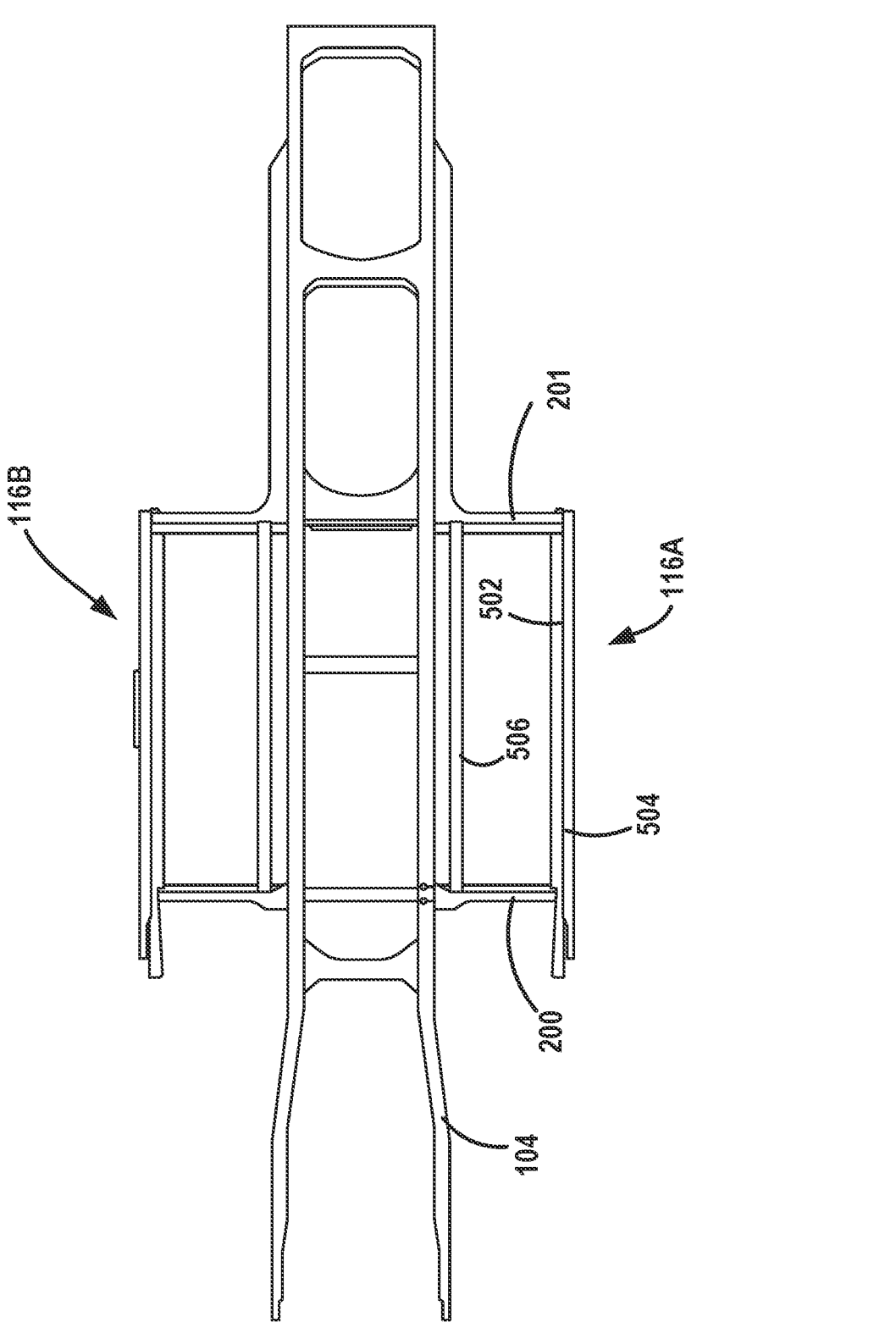

With initial reference to FIGS. 6A-6C, first front bracket 200 and first rear bracket 201 may be spaced apart and coupled together via one or more side members. In various embodiments, first hydrogen tank mount assembly 116A comprises multiple side members coupled to first front bracket 200 and first rear bracket 201 to provide a sufficiently rigid and strong structure within which a hydrogen fuel tank (such as first hydrogen storage tank 230A) may be mounted.

First hydrogen tank mount assembly 116A may comprise a first upper outboard rail 502 coupled to first front bracket 200 and first rear bracket 201. For example, first upper outboard rail 502 may be coupled to first front outboard bracket portion 204 and first rear outboard bracket portion 404. In various embodiments, first upper outboard rail 502 is coupled to flanges 220A and 220C of front bracket 200 and flange 420A of rear bracket 201.

Further, first hydrogen tank mount assembly 116A may comprise a first lower outboard rail 504 (positioned closer to the ground relative to first upper outboard rail 502) coupled to first front bracket 200 and first rear bracket 201. First upper outboard rail 502 and first lower outboard rail 504 may be, for example, substantially parallel to each other. As with first upper outboard rail 502, first lower outboard rail 504 may be coupled to first front outboard bracket portion 204 and first rear outboard bracket portion 404. In various embodiments, first lower outboard rail 504 is coupled to flanges 220A and 220B of front bracket 200 and flange 420B of rear bracket 201.

Rails 502, 504 may provide sufficient strength to first hydrogen tank mount assembly 116A to resist deformation and structural damage during operation and, potentially, during impact events (e.g., vehicle crashes). Rails 502, 504 may also maintain proper alignment between first front bracket 200 and first rear bracket 201, reducing stress and strain experienced by first hydrogen storage tank 230A.

First upper outboard rail 502 and first lower outboard rail 504 may be coupled to a first vertical support 508 and a second vertical support 514. In various embodiments, one or more steps 510 may be positioned between and coupled to first vertical support 508 and second vertical support 514. For example, a lower step 510A and an upper step 510B may be coupled to first vertical support 508 and second vertical support 514 to provide easier access to components of vehicle 100, including cab 101.

In various embodiments, first hydrogen tank mount assembly 116A may further comprise a first lower inboard rail 506. For example, first lower inboard rail 506 may extend substantially parallel to first upper outboard rail 502 and first lower outboard rail 504 and coupled to first front bracket 200 and first rear bracket 201. In various embodiments, first lower inbound rail 506 may be coupled to first front inboard bracket portion 206 and first rear inboard bracket portion 406. First lower inboard rail 506 may be substantially parallel to one or more of rails 502, 504, and may assist rails 502, 504 to maintain proper alignment between first front bracket 200 and first rear bracket 201, reducing stress and strain experienced by first hydrogen storage tank 230A.

Figure 6D:
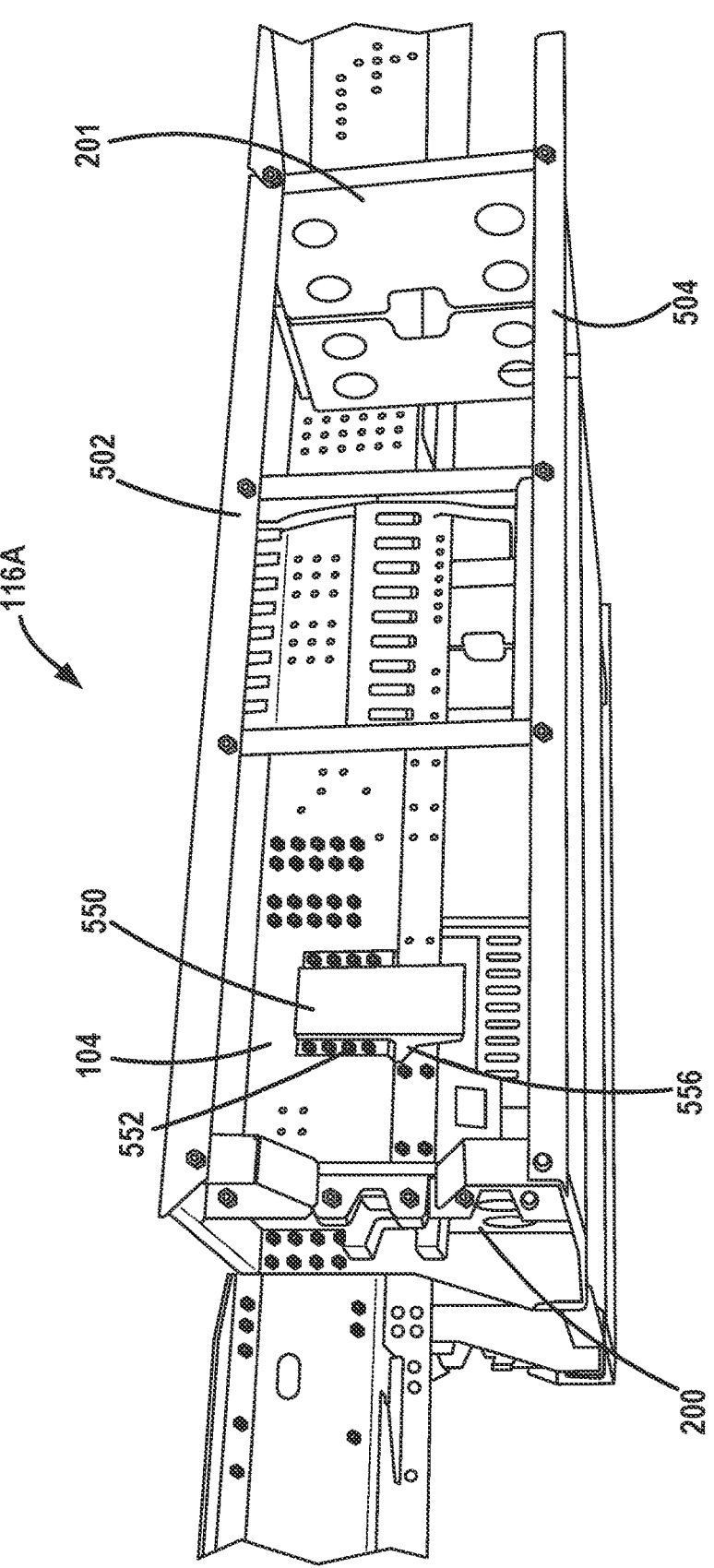

With initial reference to FIG. 6D, first hydrogen tank mount assembly 116A may further comprise an end stop bracket 550. In various embodiments, end stop bracket 550 is coupled to a component of chassis 102 such as, for example, frame rail 104. End stop bracket 550 may protrude from frame rail 104 towards first hydrogen storage tank 230A. During an impact against first hydrogen tank assembly 116A, end stop bracket 550 may prevent tank 230A from impacting frame rail 104.

In various embodiments, end stop bracket 550 comprises a face 556 coupled to one or more flanges 552. Flanges 552 may couple end stop bracket 550 to chassis 102 such as, for example, coupling to first frame rail 104 via one or more fasteners. Any suitable method of coupling end stop bracket 550, including removably (e.g., via fasteners) or permanently (e.g., via welding) is within the scope of the present disclosure. End stop bracket 550 may further comprise a seat 556. For example, seat 556 may align or otherwise position end stop bracket 550 in a desired position relative to frame rail 104. In various embodiments, seat 556 may be positioned adjacent to a bottom surface of frame rail 104.

With reference again to FIG. 3, first hydrogen tank mount assembly 116A may further comprise a front push bar assembly 520. For example, front push bar assembly 520 may comprise a push bar 522, a first bearing mount 524, and a second bearing mount 526 opposite first bearing mount 524. Further, first hydrogen tank mount assembly 116A may comprise a rear push bar assembly 530 having a rear push bar 532, a first rear bearing mount 534, and a second rear bearing mount 536 opposite first rear bearing mount 534.

First bearing mounts 524, 534 and second bearing mounts 526, 536 may be coupled to respective push bars 522, 532 in a suitable manner. For example, first bearing mounts 524, 534 and the second bearing mounts 526, 536 may be inserted into apertures formed in the ends of the respective push bars 522, 532 and coupled to the push bars using one or more fasteners, welded joints, rivets, or the like. In various embodiments, push bars 522, 532 may be inserted into apertures formed in respective first bearing mounts 524, 534 and second bearing mounts 526, 536 and coupled using one or more fasteners, welded joints, rivets, or the like. Moreover, in various embodiments, a flat surface (top, bottom, front, rear) on push bars 522, 532 may interface with a flat surface (top, bottom, front, rear) on the first bearing mounts 524, 534 and second bearing mounts 526, 536 and coupled together using one or more fasteners, welded joints, rivets, or the like. Additionally, in various embodiments, push bars 522, 532, first bearing mounts 524, 534, and second bearing mounts 526, 536 may be formed as single, integral components.

First bearing mounts 524, 534 may be coupled to respective mounting flanges 222A, 422A of first front inboard bracket portion 206 and first rear inboard bracket portion 406. Further, second bearing mounts 526, 536 may be coupled to respective mounting flanges of second front bracket 202 and second rear bracket 203.

With reference again to FIGS. 4A-B and 6A-6D, deformable tank mount 440 may, for example, elastically deform in response to force applied in the X direction to first hydrogen tank mount assembly 116A. In various embodiments, one or more components of first hydrogen tank mount assembly 116A, such as first upper outboard rail 502, first lower outboard rail 504, first lower inboard rail 506, first vertical support 508 and/or a second vertical support 514, lower step 510A, and/or upper step 510B, are displaced in the X direction towards first frame rail 104 and towards first hydrogen storage tank 230A. These components may contact first hydrogen storage tank 230A and transfer force to components of first hydrogen storage tank 230A in the X direction. In such circumstances, in response to force being applied to first hydrogen storage tank 230A in the X direction, one or more outboard mounting arms 430A and one or more inboard mounting arms 430B of deformable tank mount 440 may dissipate a portion of the force by plastically deforming. Deformation of deformable tank mount 440 may reduce or prevent damage to components of first hydrogen storage tank 230A, including tank body 258, rear tank neck 462, second tank neck mount 466, and/or tank boss 457. Further, deformation of deformable tank mount 440 in response to a threshold level of force being applied to first hydrogen storage tank 230A may also reduce or prevent damage to components of first hydrogen storage tank 230A positioned closer to first bracket 200 (in other words, the front end of first hydrogen storage tank 230A), such as front tank neck 252 and/or first neck mount 256.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the specification or claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Systems, methods, and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A pressure vessel mounting system for mounting a pressure vessel to a vehicle chassis, the system comprising:
   a front bracket having a tank neck cavity and a front frame mounting flange;
   a rear bracket having a deformable tank mount; and
   a first outboard rail coupled to the front bracket and the rear bracket,
       wherein the front bracket and the rear bracket are substantially parallel,
       wherein the first outboard rail extends between the front bracket and the rear bracket substantially perpendicular thereto,
       wherein the deformable tank mount comprises an inboard mounting arm and an outboard mounting arm coupled to the rear bracket,
       wherein the rear bracket comprises a rear inboard bracket portion coupled to a rear outboard bracket portion, and wherein the rear inboard bracket portion comprises at least one flange coupled to the inboard mounting arm of the deformable tank mount and the rear outboard bracket portion comprises at least one flange coupled to the outboard mounting arm of the deformable tank mount.

2. The pressure vessel mounting system of claim 1, further comprising a second outboard rail coupled to and extending between the front bracket and the rear bracket, wherein the first outboard rail and the second outboard rail are substantially parallel to each other.

3. The pressure vessel mounting system of claim 1, further comprising a first inboard rail coupled to and extending between the front bracket and the rear bracket, wherein the first outboard rail and the first inboard rail are substantially parallel to each other.

4. The pressure vessel mounting system of claim 1, wherein the front bracket comprises a front inboard bracket portion and a front outboard bracket portion, and wherein the tank neck cavity is positioned in a portion of the front inboard bracket portion and the front outboard bracket portion.

5. The pressure vessel mounting system of claim 4, wherein the front inboard bracket portion comprises a first notch and the front outboard bracket portion comprises a second notch, and wherein, when the front inboard bracket portion is coupled to the front outboard bracket portion, the first notch and the second notch align to form the tank neck cavity.

6. The pressure vessel mounting system of claim 1, wherein the rear outboard bracket portion comprises an outer edge flange.

7. A vehicle chassis, comprising:
a first frame rail substantially parallel to and spaced apart from a second frame rail;
at least two crossmembers coupled to the first frame rail and the second frame rail;
a gaseous fuel tank having a front neck, a rear neck, a front tank boss positioned concentrically within the front neck, and a rear tank boss positioned concentrically within the rear neck; and
a first gaseous fuel tank mounting assembly coupled to the first frame rail, the first gaseous fuel tank mounting assembly comprising:
a front bracket having a tank neck cavity and a front frame mounting flange;
a rear bracket having a deformable tank mount and a rear frame mounting flange; and
a first outboard rail coupled to the front bracket and the rear bracket,
wherein the front frame mounting flange and the rear frame mounting flange are coupled to the first frame rail,
wherein the front tank boss is coupled to the front bracket,
wherein the rear tank boss is coupled to the deformable tank mount,
wherein the front bracket and the rear bracket are substantially parallel,
wherein the first outboard rail defines a substantially 90 degree angle where it meets each of the front bracket and the rear bracket, and
wherein the deformable tank mount comprises an inboard mounting arm and an outboard mounting arm, and wherein the rear bracket comprises at least one flange coupled to the inboard mounting arm of the deformable tank mount and at least one flange coupled to the outboard mounting arm of the deformable tank mount.

8. The vehicle chassis of claim 7, further comprising a second outboard rail coupled to and extending between the front bracket and the rear bracket, wherein the first outboard rail and the second outboard rail are substantially parallel to each other.

9. The vehicle chassis of claim 7, further comprising a first inboard rail coupled to and extending between the front bracket and the rear bracket, wherein the first outboard rail and the first inboard rail are substantially parallel to each other.

10. The vehicle chassis of claim 7, wherein the front bracket comprises a front inboard bracket portion coupled to a front outboard bracket portion, and wherein the tank neck cavity is positioned in a portion of the front inboard bracket portion and the front outboard bracket portion.

11. The vehicle chassis of claim 10, wherein the front inboard bracket portion comprises a first notch and the front outboard bracket portion comprises a second notch, and wherein the first notch and the second notch align to form the tank neck cavity.

12. The vehicle chassis of claim 10, wherein the front inboard bracket portion comprises a first coupling flange coupled to a second coupling flange of the front outboard bracket portion.

13. The vehicle chassis of claim 7, wherein the rear bracket comprises a rear inboard bracket portion coupled to a rear outboard bracket portion, and wherein the rear outboard bracket portion comprises an outer edge flange coupled to the first outboard rail.

14. A hydrogen electric vehicle, comprising:
a first frame rail substantially parallel to and spaced apart from a second frame rail;
at least two crossmembers coupled to the first frame rail and the second frame rail;
a gaseous fuel tank having a front neck, a rear neck, a front tank boss positioned concentrically within the front neck, and a rear tank boss positioned concentrically within the rear neck; and
a first gaseous fuel tank mounting assembly coupled to the first frame rail and comprising a front bracket having a tank neck cavity and a front frame mounting flange, a rear bracket having a deformable tank mount and a rear frame mounting flange, and a first outboard rail coupled to the front bracket and the rear bracket,
wherein the front frame mounting flange and the rear frame mounting flange are coupled to the first frame rail,
wherein the front tank boss is coupled to the front bracket,
wherein the rear tank boss is coupled to the deformable tank mount,
wherein the front bracket and the rear bracket are substantially parallel,
wherein the hydrogen electric vehicle is configured with a front end and a rear end defining a forward axis of motion for the hydrogen electric vehicle, and wherein the first outboard rail is substantially parallel to the forward axis of motion, and
wherein the deformable tank mount comprises an inboard mounting arm and an outboard mounting arm, and wherein the rear bracket comprises at least one flange coupled to the inboard mounting arm of the deformable tank mount and at least one flange coupled to the outboard mounting arm of the deformable tank mount.

15. The hydrogen electric vehicle of claim 14, further comprising a second gaseous fuel tank mounting assembly coupled to the second frame rail.

16. The hydrogen electric vehicle of claim 14, wherein the front bracket comprises a front inboard bracket portion coupled to a front outboard bracket portion, and wherein the tank neck cavity is positioned in a portion of the front inboard bracket portion and the front outboard bracket portion.

17. The hydrogen electric vehicle of claim 16, wherein the front inboard bracket portion comprises a first notch and the front outboard bracket portion comprises a second notch, and wherein the first notch and the second notch align to form the tank neck cavity.

18. The hydrogen electric vehicle of claim 16, wherein the front inboard bracket portion comprises a first coupling flange coupled to a second coupling flange of the front outboard bracket portion.

19. The hydrogen electric vehicle of claim 14, wherein the rear bracket comprises a rear inboard bracket portion coupled to a rear outboard bracket portion, and wherein the rear outboard bracket portion comprises an outer edge flange coupled to the first outboard rail.

20. The hydrogen electric vehicle of claim 14, further comprising a second outboard rail coupled to and extending between the front bracket and the rear bracket, wherein the first outboard rail and the second outboard rail are substantially parallel to each other.

* * * * *